US011914313B2

(12) United States Patent
Tanaka

(10) Patent No.: US 11,914,313 B2
(45) Date of Patent: Feb. 27, 2024

(54) IMAGE FORMING APPARATUS

(71) Applicant: FUJIFILM Business Innovation Corp., Tokyo (JP)

(72) Inventor: Daisuke Tanaka, Ebina (JP)

(73) Assignee: FUJIFILM Business Innovation Corp., Tokyo (JP)

(*) Notice: Subject to any disclaimer, the term of this patent is extended or adjusted under 35 U.S.C. 154(b) by 1 day.

(21) Appl. No.: 17/369,436

(22) Filed: Jul. 7, 2021

(65) Prior Publication Data

US 2022/0308502 A1 Sep. 29, 2022

(30) Foreign Application Priority Data

Mar. 25, 2021 (JP) ................................ 2021-052326

(51) Int. Cl.
*G03G 15/16* (2006.01)

(52) U.S. Cl.
CPC ......... *G03G 15/161* (2013.01); *G03G 15/162* (2013.01)

(58) Field of Classification Search
CPC .......................... G03G 15/161; G03G 15/162
See application file for complete search history.

(56) References Cited

U.S. PATENT DOCUMENTS 5,600,405 A * 2/1997 Umeda ................ G03G 15/161 399/354
2010/0034549 A1* 2/2010 Nakamatsu ........ G03G 21/0017 399/350
2018/0113402 A1 4/2018 Seko et al.

FOREIGN PATENT DOCUMENTS

JP 2009-236988 A 10/2009
JP 2010169762 A 8/2010

OTHER PUBLICATIONS

Communication dated Jan. 14, 2022 issued by the European Patent Office in application No. 21189960.4.

* cited by examiner

*Primary Examiner* — Stephanie E Bloss
*Assistant Examiner* — Michael A Harrison
(74) *Attorney, Agent, or Firm* — Sughrue Mion, PLLC

(57) ABSTRACT

An image forming apparatus includes: a toner feed body that is an endless belt holding a toner image, or is a transfer member transferring a toner image to a recording medium nipped between the endless belt and the transfer member; an electric charge imparting member that is provided so as to face a surface of the toner feed body and increases an amount of electric charges of toner adhering to the surface of the toner feed body; and a toner attracting member that is provided at a more downstream part of the toner feed body than the electric charge imparting member in a feed direction of the toner feed body and attracts the toner by being applied with a voltage having a polarity opposite to a polarity of the toner adhering to the surface of the toner feed body.

12 Claims, 4 Drawing Sheets

IMAGE FORMING APPARATUS

CROSS-REFERENCE TO RELATED APPLICATIONS

This application is based on and claims priority under 35 USC 119 from Japanese Patent Application No. 2021-052326 filed on Mar. 25, 2021.

BACKGROUND

1. Technical Field

The present invention relates to an image forming apparatus.

2. Related Art

JP-A-2009-236988 discloses an image forming apparatus including a feed member that feeds at least one of a toner image and a sheet carrying the toner image, a static eliminator that eliminates static electricity from paper dust adhering to the feed member, and a removing device that is provided on a downstream side of the static eliminator in a moving direction of the feed member and removes toner and the paper dust adhering to the feed member.

SUMMARY

Aspects of non-limiting embodiments of the present disclosure relate to improving an effect of removing toner adhering to a feed member as compared with a case of simple electrostatic absorption.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including: a toner feed body that is an endless belt holding a toner image, or is a transfer member transferring a toner image to a recording medium nipped between the endless belt and the transfer member; an electric charge imparting member that is provided so as to face a surface of the toner feed body and increases an amount of electric charges of toner adhering to the surface of the toner feed body; and a toner attracting member that is provided at a more downstream part of the toner feed body than the electric charge imparting member in a feed direction of the toner feed body and attracts the toner by being applied with a voltage having a polarity opposite to a polarity of the toner adhering to the surface of the toner feed body.

BRIEF DESCRIPTION OF THE DRAWINGS

Exemplary embodiments of the present invention will be described in detail based on the following figures, wherein.

DETAILED DESCRIPTION

Figure 1:
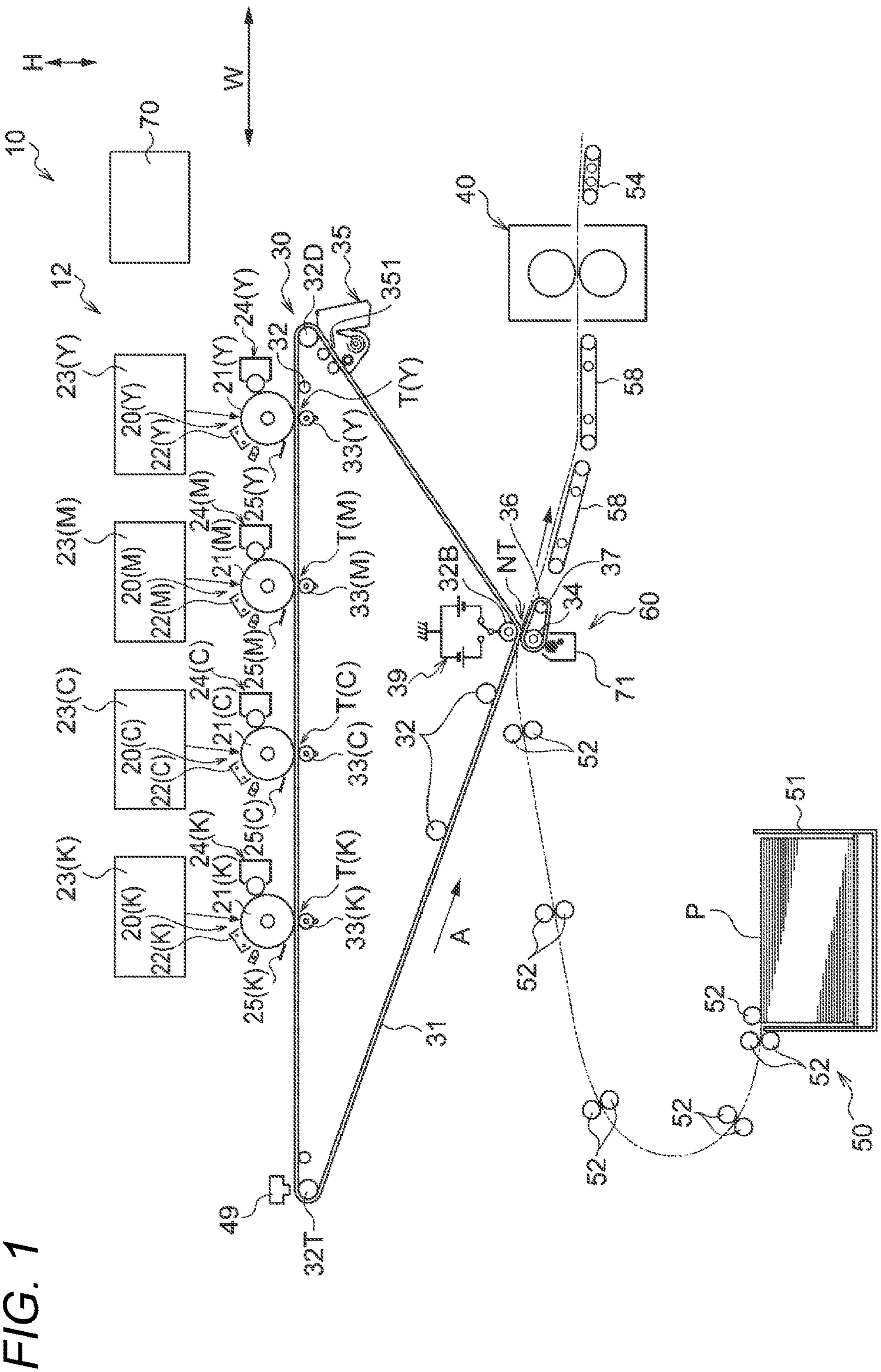
FIG. 1 is a schematic diagram illustrating a configuration of an image forming apparatus according to the present exemplary embodiment as viewed from a front side.

Hereinafter, an example of an exemplary embodiment according to the present invention will be described with reference to the drawings. In the drawings, an arrow H indicates a vertical direction, and an arrow W indicates a horizontal direction and an apparatus width direction.

<Configuration of Image Forming Apparatus 10>

FIG. 1 is a schematic diagram illustrating a configuration of an image forming apparatus 10 as viewed from a front side. As illustrated in FIG. 1, the image forming apparatus 10 includes an image forming unit 12 that forms an image on a recording medium P such as a sheet by an electrophotographic process, a feed device 50 that feeds the recording medium P, and a control unit 70 that controls an operation of each unit of the image forming apparatus 10.

(Feed Device 50)

As illustrated in FIG. 1, the feed device 50 includes an accommodating portion 51 that accommodates the recording medium P, and plural feed rollers 52 that feed the recording medium P from the accommodating portion 51 to a secondary transfer position NT. The transport device 50 further includes plural feed belts 58 that feed the recording medium P from the secondary transfer position NT to a fixing device 40, and a feed belt 54 that feeds the recording medium P from the fixing device 40 to a discharge unit (not illustrated) of the recording medium P.

(Image Forming Unit 12)

The image forming unit 12 includes toner image forming units 20 that form toner images, a transfer device 30 that transfers the toner images formed by the toner image forming units 20 to the recording medium P, and the fixing device 40 that fixes the toner images transferred to the recording medium P to the recording medium P by heating and pressurizing the toner images.

The plural the toner image forming units 20 are provided so as to form the toner image for each color. In the present exemplary embodiment, the toner image forming units 20 of a total of four colors of yellow (Y), magenta (M), cyan (C), and black (K) are provided. The toner image forming units 20 of the respective colors are arranged in the order of yellow (Y), magenta (M), cyan (C), and black (K) from an upstream side to a downstream side in a feed direction of an intermediate transfer belt 31 to be described later.

The (Y), (M), (C), and (K) illustrated in FIG. 1 indicate constituent portions corresponding to the respective colors. In the description of the present specification, parentheses of (Y), (M), (C), and (K) may be omitted, and (Y), (M), (C), and (K) may be referred to as Y, M, C, and K.

[Toner Image Forming Unit 20]

Figure 2:
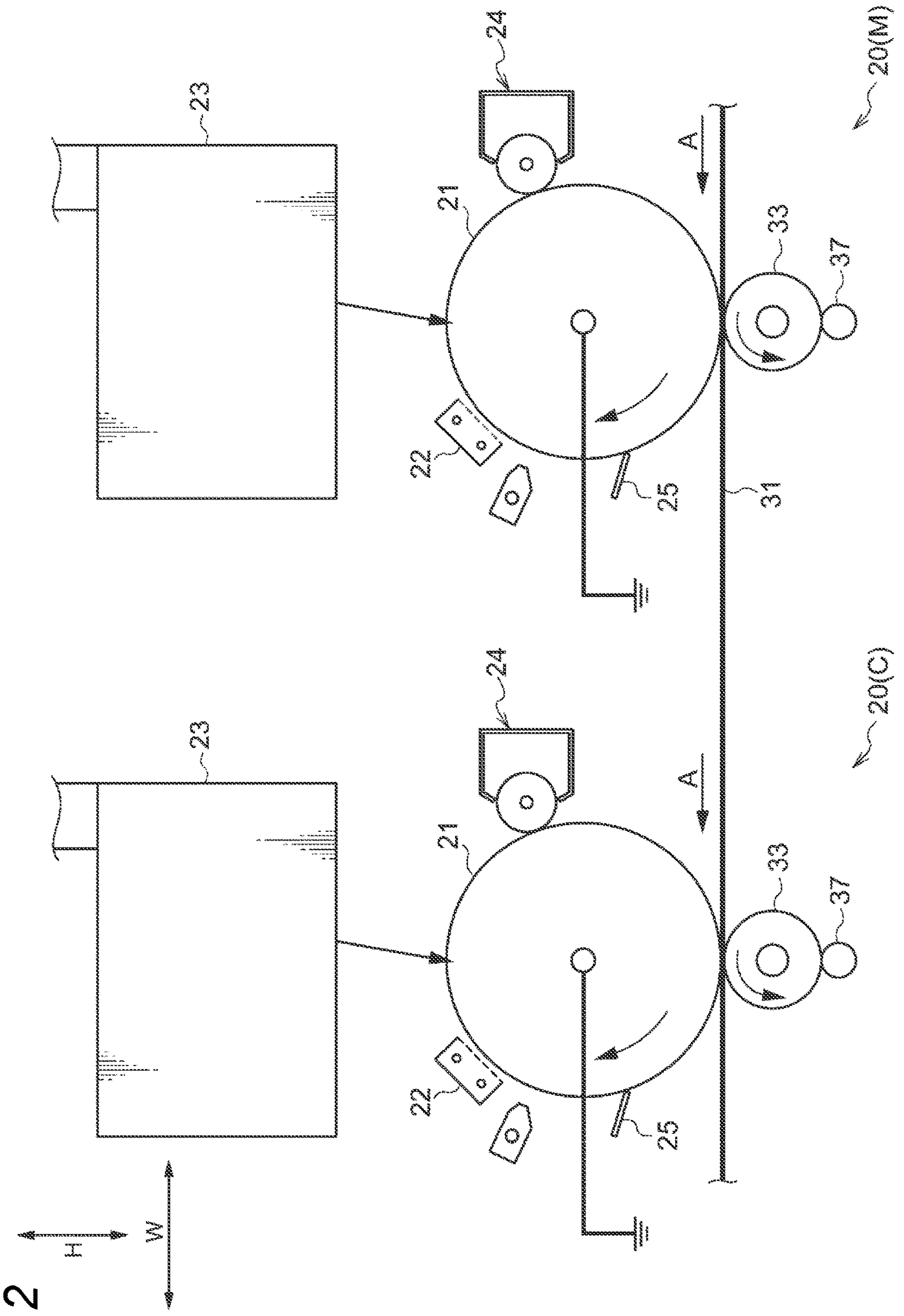
FIG. 2 is a schematic diagram illustrating a toner image forming unit according to the present exemplary embodiment.

The toner image forming unit 20 of each color is basically configured in a similar manner except for toner to be used. Specifically, as illustrated in FIG. 2, the toner image forming unit 20 of each color includes a photoconductor drum 21 that rotates clockwise in FIG. 2, a charging unit 22 that charges the photoconductor drum 21, and an exposure device 23 that exposes the photoconductor drum 21 charged by the charging unit 22 to form an electrostatic latent image on the photoconductor drum 21. The toner image forming unit 20 of each color further includes a developing device 24 that develops the electrostatic latent image formed on the photoconductor drum 21 by the exposure device 23 to form a toner image, and a blade 25 that removes toner remaining on a surface of the photoconductor drum 21 after the toner image is transferred to the transfer device 30.

For example, the charging unit 22 negatively charges the surface (a photosensitive layer) of the photoconductor drum 21. On the surface of the photoconductor drum 21 that has been negatively charged, a portion irradiated with an exposure light L by the exposure device 23 has a positive polarity, and the electrostatic latent image is formed on the surface of the photoconductor drum 21. Then, toner triboelectrically charged to the negative polarity in the developing device 24 adheres to the electrostatic latent image having the positive polarity, and the electrostatic latent image is developed. In this way, the toner image is formed on the surface (an outer circumferential surface) of the photoconductor drum 21. The blade 25 is in contact with the surface of the photoconductor drum 21 and scrapes off the toner remaining on the surface of the photoconductor drum 21.

[Transfer Device 30]

The transfer device 30 primarily transfers the toner images of the photoconductor drums 21 of the respective colors to the intermediate transfer belt 31 in a superimposed manner, and secondarily transfers the superimposed toner images to the recording medium P at the secondary transfer position NT (an example of a nip). Specifically, as illustrated in FIG. 1, the transfer device 30 includes the intermediate transfer belt 31 as an example of an endless belt and an example of a toner feed body that is a transfer body, primary transfer rollers 33, a secondary transfer belt 36 as an example of a toner feed body that is a transfer body, a cleaning device 60 for the secondary transfer belt 36, and a cleaning device 35 for the intermediate transfer belt 31.

[Intermediate Transfer Belt 31]

As illustrated in FIG. 1, the intermediate transfer belt 31 has an endless shape and is wound around plural rollers 32 to determine a posture thereof. In the present exemplary embodiment, the intermediate transfer belt 31 has an inverted obtuse triangular shape that is long in the apparatus width direction in a front view. Among the plural rollers 32, a roller 32D illustrated in FIG. 1 functions as a driving roller that rotates the intermediate transfer belt 31 in an arrow A direction by the power of a motor (not illustrated). The intermediate transfer belt 31 rotates in the arrow A direction to feed the primarily transferred image to the secondary transfer position NT.

Among the plural rollers 32, a roller 32T illustrated in FIG. 1 functions as a tension applying roller that applies tension to the intermediate transfer belt 31. Among the plural rollers 32, a roller 32B illustrated in FIG. 1 functions as a facing roller of a secondary transfer roller 34. A top portion on a lower end side forming an obtuse angle of the intermediate transfer belt 31 in the posture of the inverted obtuse triangle as described above is wound around the facing roller 32B. The intermediate transfer belt 31 is in contact with the photoconductor drums 21 of the respective colors from below at an upper side portion extending in the apparatus width direction in the above-described posture.

[Primary Transfer Roller 33]

As illustrated in FIG. 1, the primary transfer rollers 33 are rollers that transfer the toner images on the respective photoconductor drums 21 to the intermediate transfer belt 31, and are disposed inside the intermediate transfer belt 31. Each of the primary transfer rollers 33 is disposed to face the photoconductor drum 21 of the corresponding color with the intermediate transfer belt 31 interposed therebetween. Further, a primary transfer voltage having a polarity opposite to a toner polarity is applied to the primary transfer roller 33 by a power supply unit (not illustrated). By the application of the primary transfer voltage, the toner image formed on the photoconductor drum 21 is transferred to the intermediate transfer belt 31 at a primary transfer position T between the photoconductor drum 21 and the primary transfer roller 33.

[Secondary Transfer Belt 36]

Figure 3A:
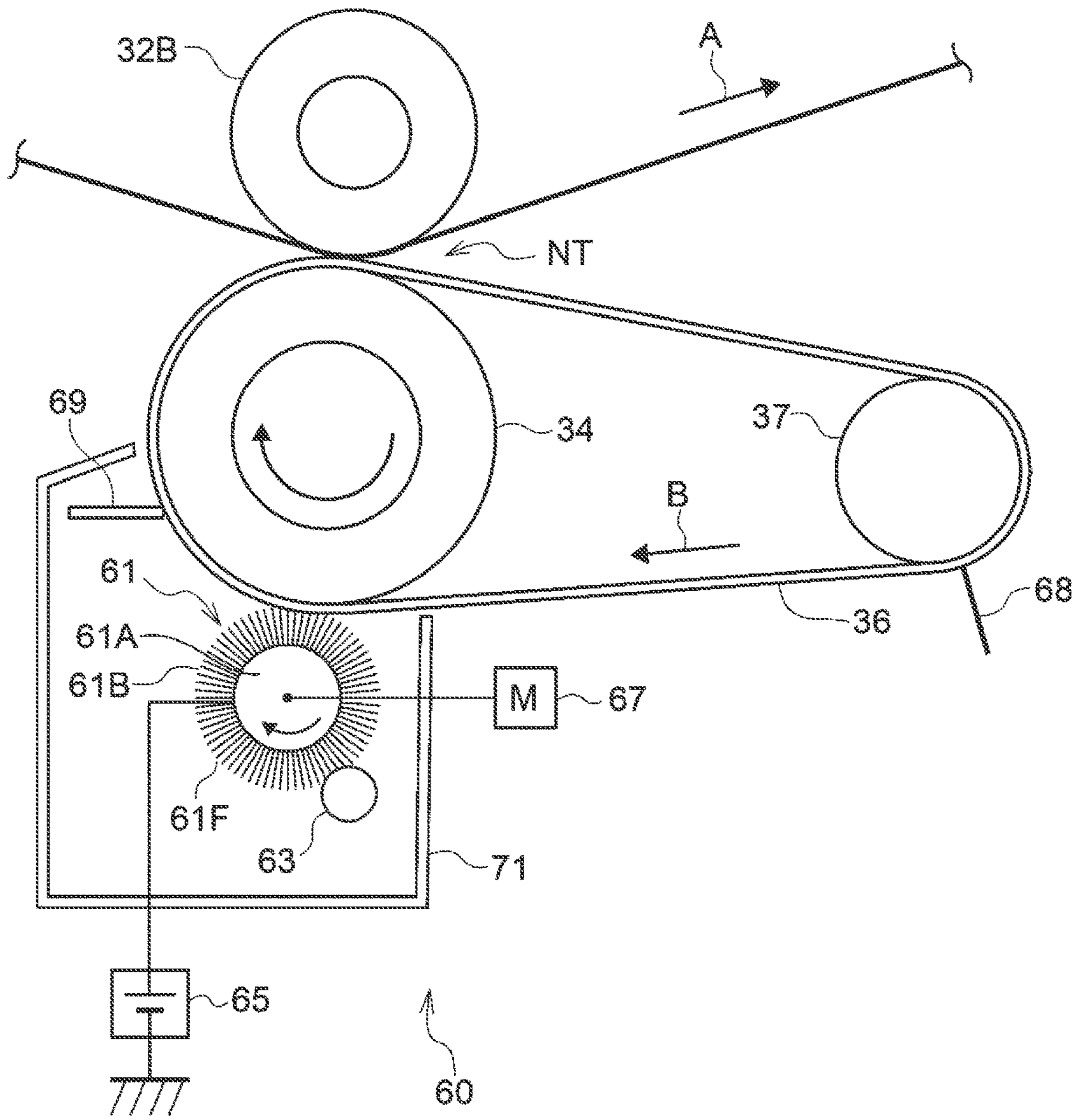
FIG. 3A is a schematic diagram illustrating a cleaning device according to the present exemplary embodiment.

The secondary transfer belt 36 is a belt that transfers the toner image superimposed on the intermediate transfer belt 31 to the recording medium P. As illustrated in FIG. 3A, the secondary transfer belt 36 has an endless shape and is wound around the secondary transfer roller 34 and the driven roller 37.

The secondary transfer roller 34 is disposed such that the intermediate transfer belt 31 and the secondary transfer belt 36 are interposed between itself and the facing roller 32B, and the secondary transfer belt 36 and the intermediate transfer belt 31 are in contact with each other with a predetermined load. The secondary transfer position NT is defined between the secondary transfer belt 36 and the intermediate transfer belt 31 that are in contact with each other. The recording medium P is supplied from the accommodating portion 51 to the secondary transfer position NT at an appropriate time. The secondary transfer belt 36 is circularly moved in an arrow B direction by the secondary transfer roller 34 being rotationally driven.

In the present exemplary embodiment, when the toner image on the intermediate transfer belt 31 is transferred to the recording medium P, a negative-polarity voltage is applied to the facing roller 32B by a power supply unit 39. Accordingly, a potential difference is generated between the facing roller 32B and the secondary transfer roller 34. That is, when the negative-polarity voltage is applied to the facing roller 32B, a secondary transfer voltage (a positive-polarity voltage) having a polarity opposite to the toner polarity is indirectly applied to the secondary transfer roller 34 forming a counter electrode of the facing roller 32B. Accordingly, a negative toner image is transferred from the intermediate transfer belt 31 to the recording medium P passing through the secondary transfer position NT.

On the other hand, in a case where the toner on the intermediate transfer belt 31 is held on the intermediate transfer belt 31 when the toner passes through the secondary transfer position NT, the positive voltage is applied to the facing roller 32B by the power supply unit 39. Accordingly, a potential difference is generated between the facing roller 32B and the secondary transfer roller 34. That is, when the positive-polarity voltage is applied to the facing roller 32B, a non-transfer voltage (the negative-polarity voltage) having the same polarity as the toner polarity is indirectly applied to the secondary transfer roller 34 forming the counter electrode of the facing roller 32B. Accordingly, the toner passing through the secondary transfer position NT receives a repulsive force from the secondary transfer roller 34 and is held on the intermediate transfer belt 31.

[Cleaning Device 60 of Secondary Transfer Belt 36]

Figure 3B:
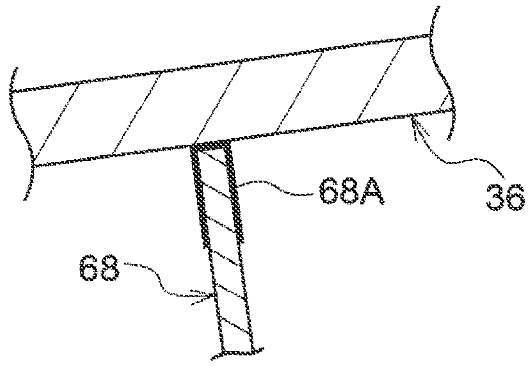
FIG. 3B is a cross-sectional view illustrating an example of a film.

As illustrated in FIGS. 3A and 3B, the cleaning device 60 includes a cleaning brush 61 that is in contact with the secondary transfer belt 36 and absorbs and cleans the toner on the secondary transfer belt 36 by an electrostatic force corresponding to an applied bias voltage.

The cleaning brush 61 is an example of a toner attracting member, and is a cylindrical roller brush as an example of being in contact with a toner feed body.

For example, the cleaning brush 61 is provided at a portion of the secondary transfer belt 36 wound around the secondary transfer roller 34.

The expression "to clean the toner adhering to the belt" is synonymous with the expression "to remove the toner from the belt".

The cleaning brush 61 includes a shaft portion 61A made of metal and a brush portion 61B made of a synthetic resin and provided on an entire outer periphery of the shaft portion 61A. In the brush portion 61B, a large number of first bristle materials 61F extend from the shaft portion 61A in a radial direction (a radially outward direction).

The cleaning brush 61 rotates when the shaft portion 61A is driven to rotate by a rotation driving device 67 including a motor, a speed reducer, and the like (not illustrated). As an example, the cleaning brush 61 rotates in the same direction as a circulation direction of the secondary transfer belt 36 (clockwise in FIG. 3A).

The rotation driving device 67 may also rotate the cleaning brush 61 in a direction opposite to the circulation direction of the secondary transfer belt 36 (counterclockwise in FIG. 3). When the cleaning brush 61 rotates in the direction opposite to the circulation direction of the secondary transfer belt 36, for example, the cleaning brush 61 rotates with a circumferential speed difference with respect to a circumferential speed of the secondary transfer belt 36.

The cleaning device 60 includes a power supply portion 65 that applies a positive-polarity bias voltage (a cleaning voltage) to the shaft portion 61A of the cleaning brush 61.

The cleaning device 60 includes a columnar flicking bar 63 that is in contact with the brush portion 61B of the cleaning brush 61 to flick the first bristle materials 61F. As for removing the toner of the cleaning brush 61, it is not limited to the flicker bar 63, and other members such as a roller-shaped brush may be used.

Further, in the cleaning device 60, a film 68, which is an example of an electric charge imparting member, is provided to face an outer peripheral surface of the secondary transfer belt 36 at an upstream side of the cleaning brush 61 in the circulation direction of the secondary transfer belt 36 and at a downstream side of the secondary transfer position NT. In the present exemplary embodiment, the film 68 is disposed below the driven roller 37, and a tip end portion of the film 68 is provided so as to be in contact with the outer peripheral surface of the secondary transfer belt 36. As an example, the film 68 is provided at a portion where the secondary transfer belt 36 is wound around the driven roller 37.

In the image forming apparatus 10 of the present exemplary embodiment, as an example, the secondary transfer belt 36 is formed of a rubber material, and the film 68 is formed of a resin material. As the resin material that forms the film 68, a resin material that is more likely to impart a negative-polarity electric charge to the toner than the material (the rubber material) that constitutes the secondary transfer belt 36 by friction with the secondary transfer belt 36 in terms of a triboelectric series is used. Therefore, when the film 68 is brought into contact with the toner adhering to a surface of the secondary transfer belt 36, it is possible to increase the amount of the negative-polarity electric charges with respect to the toner that is in contact with the film 68.

As the resin material for forming the film 68, as an example, any one of polyurethane, polyethylene, polyimide, or polystyrene may be used, but other resin materials may be used as long as it is easier to impart the negative-polarity electric charges to the toner than the material forming the secondary transfer belt 36.

The cleaning device 60 includes a blade 69 that scrapes off the toner remaining on the surface of the secondary transfer belt 36 from the surface of the secondary transfer belt 36 at a downstream side of the secondary transfer belt 36 in the circulation direction and at an upstream side of the secondary transfer position NT than the cleaning brush 61.

The cleaning device 60 includes a receiver 71 that surrounds the cleaning brush 61, the flicking bar 63, and the blade 69 between itself and the secondary transfer belt 36, and the toner removed from the secondary transfer belt 36 is configured to fall inside the receiver 71.

[Cleaning Device 35 for Intermediate Transfer Belt 31]

As illustrated in FIG. 1, the cleaning device 35 is disposed downstream of the secondary transfer position NT and upstream of the primary transfer position T (Y) in the circulation direction of the intermediate transfer belt 31. The cleaning device 35 includes a blade 351 that scrapes off the toner remaining on the surface of the intermediate transfer belt 31 from the surface of the intermediate transfer belt 31.

In the transfer device 30, a detection unit (a sensor) 49 for detecting a density detection image (a patch) and a color shift detection image (a patch) is disposed downstream (a left side in FIG. 1) of the toner image forming unit 20 (K).

The toners of yellow (Y), magenta (M), cyan (C), and black (K) used in the toner image forming units 20Y, 20M, 20C, and 20K (hereinafter, referred to as 20Y to 20K) each include a pigment and a binder resin.

The toner images formed by the toner image forming units 20Y to 20K include a transferred image to be transferred to the recording medium P and a non-transferred image not to be transferred to the recording medium P. Examples of the non-transferred image include a density detection image (a patch), a color shift detection image (a patch), an image (a band) for consuming deteriorated developer (a toner), and an image (a band) for supplying toner between the photoconductor drum 21 and the blade 25 or the like.

Figure 4:
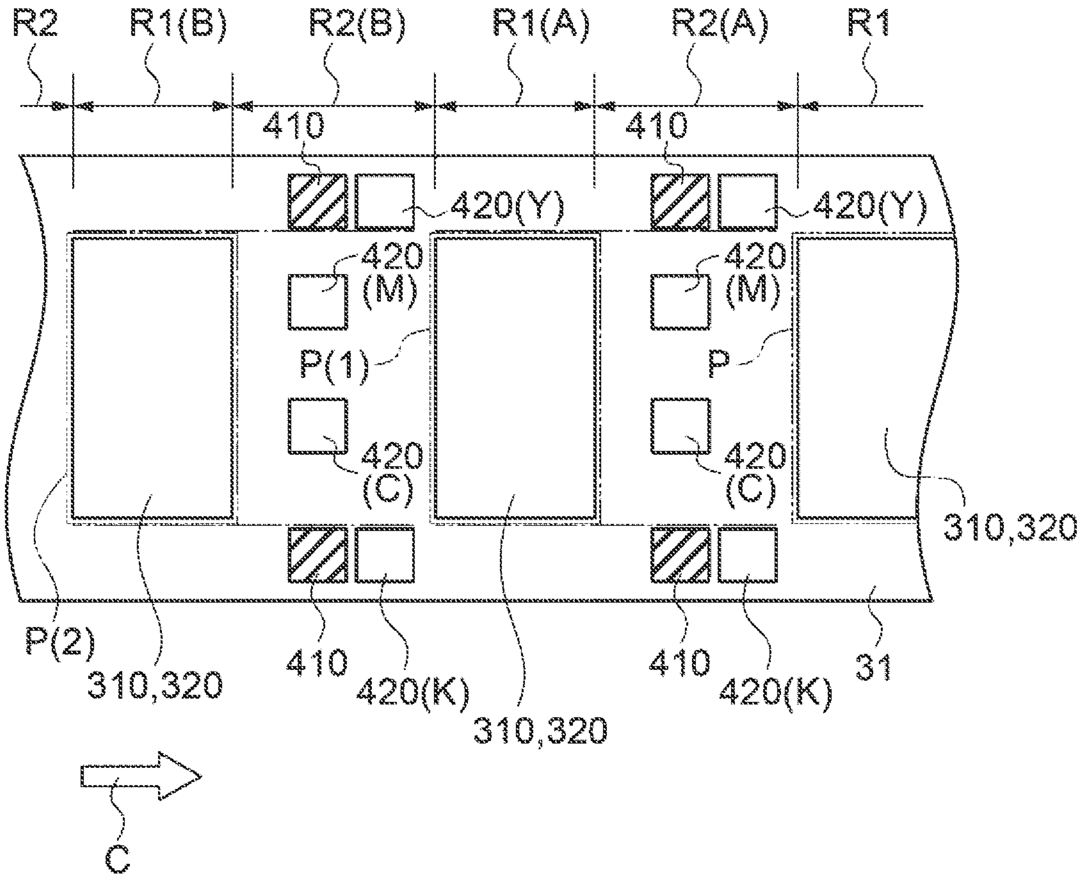
FIG. 4 is a view illustrating a non-transferred image and a transferred image on a transfer belt.

As illustrated in FIG. 4, an image 320 of each toner image forming unit 20 is transferred to transfer regions R1 on the intermediate transfer belt 31 by each primary transfer roller 33. The image 320 transferred to the intermediate transfer belt 31 passes through the secondary transfer position NT together with the recording medium P, and is transferred to the recording medium P.

On the other hand, a patch 420 of each toner image forming unit 20 is transferred to the non-transfer region R2 between the transfer regions R1 by each primary transfer roller 33. The patch 420 transferred to the intermediate transfer belt 31 passes through the secondary transfer position NT alone without passing through the secondary transfer position NT together with the recording medium P.

In the exemplary embodiment, in a case where the image 320 is transferred from the intermediate transfer belt 31 to the recording medium P, as described above, a positive-polarity secondary transfer voltage (a voltage having a polarity opposite to the toner polarity) is applied to the secondary transfer roller 34 via the facing roller 32B. Accordingly, the image 320 passing through the secondary transfer position NT together with the recording medium P is transferred from the intermediate transfer belt 31 to the recording medium P.

On the other hand, when the patch 420 passes through the secondary transfer position NT, the negative-polarity non-transfer voltage (a voltage having the same polarity as the toner polarity) is applied to the secondary transfer roller 34 via the facing roller 32B such that the patch 420 on the intermediate transfer belt 31 is held by the intermediate transfer belt 31.

Accordingly, the toner of the patch 420 on the intermediate transfer belt 31 receives the repulsive force from the secondary transfer belt 36 (the secondary transfer roller 34) and is held on the intermediate transfer belt 31. The toner of the patch 420 held on the intermediate transfer belt 31 is fed to the cleaning device 35, and is removed from the intermediate transfer belt 31 by the cleaning device 35.

Here, since the secondary transfer belt 36 and the intermediate transfer belt 31 are in contact with each other with a predetermined load, when the patch 420 is formed on the surface of the intermediate transfer belt 31, a part of the toner of the patch 420 is transferred to the secondary transfer belt 36 even if the toner receives the electrostatic repulsive force. When the toner of the patch 420 is transferred to the secondary transfer belt 36, the toner adheres to the secondary transfer belt 36 (an example of a transfer member).

Operation According to Present Exemplary Embodiment

Next, an operation according to the present exemplary embodiment will be described.

When the control unit 70 receives an image forming command (a print command), the control unit 70 operates the toner image forming units 20Y to 20K, the transfer device 30, and the fixing device 40 as described below (see FIG. 1).

In the toner image forming units 20Y to 20K, the image 320 (see FIG. 4) and the patch 420 (see FIG. 4) are formed in the following image forming steps (processes). That is, the photoconductor drum 21 of each color is charged by the charging unit 22 while being rotated. Each charged photoconductor drum 21 is exposed by each exposure device 23, and the electrostatic latent image is formed on the surface of each photoconductor drum 21. The electrostatic latent image formed on each photoconductor drum 21 is developed by the developer supplied from the developing device 24. Accordingly, the yellow (Y), magenta (M), cyan (C), and black (K) images 320 and the patches 420 are formed on photoconductor drums 21Y to 21K for the other colors, respectively.

As illustrated in FIG. 4, the images 320 of the respective colors formed on the respective photoconductor drums 21 are sequentially transferred to the transfer regions R1 of the rotating intermediate transfer belt 31 by the respective primary transfer rollers 33.

The patch 420 of each color formed on each of the photoconductor drums 21 is sequentially transferred to any position in the non-transfer regions R2 of the circulating intermediate transfer belt 31 by each of the primary transfer rollers 33.

The image 320 transferred to the intermediate transfer belt 31 is fed to the secondary transfer position NT by the circulation of the intermediate transfer belt 31.

The recording medium P is supplied to the secondary transfer position NT by the feed rollers 52 in accordance with the timing of feeding of the image 320. When the recording medium P and the image 320 (the transfer region R1) pass through the secondary transfer position NT, the secondary transfer voltage (the positive-polarity voltage) is applied to the secondary transfer roller 34 via the facing roller 32B. Accordingly, the image 320 is transferred from the intermediate transfer belt 31 to the recording medium P.

The recording medium P to which the image 320 has been transferred is fed from the secondary transfer position NT to the fixing device 40 by the feed belts 58, and the image 320 on the recording medium P is fixed to the recording medium P in the fixing device 40.

When the recording medium P does not pass through the secondary transfer position NT and the patch 420 passes through the secondary transfer position NT, the non-transfer voltage (the negative-polarity voltage) is applied to the secondary transfer roller 34 via the facing roller 32B. Accordingly, the patch 420 on the intermediate transfer belt 31 receives the repulsive force from the secondary transfer roller 34 (the second transfer belt 36) and is held by the intermediate transfer belt 31. Accordingly, the toner of the patch 420 passes through the secondary transfer position NT while being held on the intermediate transfer belt 31, is fed to the cleaning device 35, and is removed from the intermediate transfer belt 31 by the cleaning device 35.

Here, although the non-transfer voltage is applied in this way, since the secondary transfer belt 36 and the intermediate transfer belt 31 are in contact with each other with a predetermined load, a part of the toner of the patch 420 may be transferred to the secondary transfer belt 36 even if the toner receives the electrostatic repulsive force.

In the present exemplary embodiment, the toner that has been transferred to the secondary transfer belt 36 is fed to the cleaning device 60 by the circulation of the secondary transfer belt 36. The toner of the image 320 may adhere to the secondary transfer belt 36. Further, the toner adhering to the secondary transfer belt 36 is not limited to the toner having a large amount of charges but also includes toner having a small amount of charges.

The toner adhering to the secondary transfer belt 36 moves from the secondary transfer position NT to a downstream side in a feed direction (the arrow B direction) of the secondary transfer belt 36 by the circulating movement of the secondary transfer belt 36. As the secondary transfer belt 36 circulates, the film 68 slides on the surface of the secondary transfer belt 36 and is triboelectrically charged to have the negative polarity.

When the toner that adheres to the secondary transfer belt 36 and is fed comes into contact with the film 68 that has been triboelectric charged to have the negative polarity in this way, the toner is charged up with the negative-polarity electric charges, and the amount of the electric charges of an negative electrode is increased. Therefore, even if toner having a small amount of electric charges is fed, the toner comes into contact with the film 68, so that the amount of the electric charges of the toner is increased.

In the cleaning device 60, a positive-polarity voltage is applied to the cleaning brush 61 by the power supply unit 65, but since the amount of the negative-polarity electric charges of the toner on the secondary transfer belt 36 fed to the cleaning device 60 is increased by the film 68, a large potential difference is generated between the toner and the cleaning brush 61. Therefore, as compared with the case where the toner is electrostatically absorbed as it is, a large attraction force acts on a cleaning brush 61 side, which is the toner attracting member on the downstream side to which the negative-polarity voltage is applied, and the cleaning brush 61 may efficiently attract and remove the toner.

In the present exemplary embodiment, the resin material forming the film 68 is more likely to be negatively charged than the resin material forming the secondary transfer belt 36. Therefore, as compared with a case where the resin material forming the secondary transfer belt 36 and the resin material forming the film 68 have the same triboelectric series, the negative-polarity electric charges are easily imparted to the toner. As an example, when the film 68 is formed of any resin material of polyurethane, polyethylene, polyimide, and polystyrene, the toner is easily charged and the toner is easily attracted as compared with the case where the film 68 is formed of the rubber material.

In the cleaning device 60 of the present exemplary embodiment, since a large number of the bristle materials 61F of the cleaning brush 61 are brought into contact with the secondary transfer belt 36, compared with the case where the toner is adhered by a detoning roll, which is an electrostatic absorption member, the toner adhering to the secondary transfer belt 36 is easily peeled off mechanically.

Since the bristle materials 61F of the cleaning brush 61 is repelled by the flicking bar 63, the toner adhering to the bristle material 61F is separated from the bristle materials 61F and falls into the receiver 71.

If the toner on the secondary transfer belt 36 is not completely removed by the cleaning brush 61 and remains, the toner is removed by the blade 69 on the downstream side.

As illustrated in FIG. 3B, a wear-resistant layer 68A having better wear resistance than the resin material forming the film 68 may be provided at the tip end portion of the film 68 that is in contact with the secondary transfer belt 36. As a material of the wear-resistant layer 68A, for example, diamond-like carbon may be used, but other materials may be used. By providing the wear-resistant layer 68A on the film 68, it is possible to improve the wear resistance of the film 68.

Other Exemplary Embodiments

Although an exemplary embodiment of the present invention has been described above, the present invention is not limited to the above, and in addition to the above, it goes without saying that various modifications can be made within a range that does not deviate from the scope of the present invention.

In the above-described exemplary embodiment, the blade 69 is provided on the downstream side of the cleaning brush 61, but the blade 69 may be provided as needed and is not necessarily provided.

In the above-described exemplary embodiment, the cleaning brush 61, which is a roller brush, is used as an example of the toner attracting member, and the cleaning brush may be a brush provided with bristle materials on a flat plate and may not be a columnar roller brush as long as the cleaning brush can attract the charged toner. The detoning roller, which is an electrostatic absorption member, may be used instead of the cleaning crush 61.

In the above-described exemplary embodiment, the cleaning device 60 is used to clean the secondary transfer belt 36, but the cleaning device 60 may also be used to clean the intermediate transfer belt 31. In this case, although not illustrated, the cleaning device 60 may be used instead of the cleaning device 35. Accordingly, the cleaning device 60 may clean the toner adhering to the intermediate transfer belt 31, similarly to the secondary transfer belt 36.

In a case of an image forming apparatus without the secondary transfer belt 36 and having a configuration where the recording medium P is nipped between the secondary transfer roller 34 and the intermediate transfer belt 31, the secondary transfer roller 34 serves as the toner feed body of the exemplary embodiment of the present invention. In this case, although not illustrated, the cleaning device 60 may be provided so as to face the secondary transfer roller 34, and thus the toner adhering to the secondary transfer roller 34 may be cleaned by the cleaning device 60.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

REFERENCE SIGNS LIST

10 image forming apparatus
31 intermediate transfer belt (example of endless belt, example of toner feed body that is transfer member)
36 secondary transfer belt (example of toner feed body that is transfer member)
P recording medium
61 roller brush (example of toner attracting member)
68 film (example of electric charge imparting member)
68A wear-resistant layer

What is claimed is:

1. An image forming apparatus comprising:
a toner feed body that is an endless belt holding a toner image;
an electric charge imparter that is provided so as to face a surface of the toner feed body and increases an amount of electric charges of toner adhering to the surface of the toner feed body; and
a toner attractor that is provided at a more downstream part of the toner feed body than the electric charge imparter in a feed direction of the toner feed body and attracts the toner by being applied with a voltage having a polarity opposite to a polarity of the toner adhering to the surface of the toner feed body.

2. The image forming apparatus according to claim 1, wherein the toner attractor is a roller brush that is in contact with the toner feed body.

3. The image forming apparatus according to claim 1, wherein the electric charge imparter is a film that is provided so as to slide with the toner on the toner feed body being moved and is made of a resin material more likely to impart negative-polarity electric charges to the toner than a material constituting the toner feed body.

4. The image forming apparatus according to claim 2, wherein the electric charge imparter is a film that is provided so as to slide with the toner on the toner feed body being moved and is made of a resin material more likely to impart negative-polarity electric charges to the toner than a material constituting the toner feed body.

5. The image forming apparatus according to claim 3, wherein the film is formed of at least one material selected from polyurethane, polyethylene, polyimide, and polystyrene.

6. The image forming apparatus according to claim 4, wherein the film is formed of at least one material selected from polyurethane, polyethylene, polyimide, and polystyrene.

7. The image forming apparatus according to claim 1, wherein the electric charge imparter is provided with a wear-resistant layer made of a material having better wear resistance than a material constituting the electric charge imparter at a portion of the electric charge imparter in contact with the toner feed body.

8. The image forming apparatus according to claim 2, wherein the electric charge imparter is provided with a wear-resistant layer made of a material having better wear resistance than a material constituting the electric charge imparter at a portion of the electric charge imparter in contact with the toner feed body.

9. The image forming apparatus according to claim 3, wherein the electric charge imparter is provided with a wear-resistant layer made of a material having better wear resistance than a material constituting the electric charge imparter at a portion of the electric charge imparter in contact with the toner feed body.

10. The image forming apparatus according to claim 4, wherein the electric charge imparter is provided with a wear-resistant layer made of a material having better wear resistance than a material constituting the electric charge imparter at a portion of the electric charge imparter in contact with the toner feed body.

11. The image forming apparatus according to claim 5, wherein the electric charge imparter is provided with a wear-resistant layer made of a material having better wear resistance than a material constituting the electric charge imparter at a portion of the electric charge imparter in contact with the toner feed body.

12. The image forming apparatus according to claim 6, wherein the electric charge imparter is provided with a wear-resistant layer made of a material having better wear resistance than a material constituting the electric charge imparter at a portion of the electric charge imparter in contact with the toner feed body.

* * * * *